(12) United States Patent
Glenn et al.

(10) Patent No.: US 7,902,975 B2
(45) Date of Patent: *Mar. 8, 2011

(54) SERVER SYSTEM FOR REMOTE MONITORING

(75) Inventors: Gregory M. Glenn, Galt, CA (US); Damon Silva, Hanford, CA (US); Timothy Henry, Visalia, CA (US)

(73) Assignee: Cumulous Communications Corporation, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/698,977

(22) Filed: Feb. 2, 2010

(65) Prior Publication Data

US 2010/0188207 A1   Jul. 29, 2010

Related U.S. Application Data

(63) Continuation of application No. 11/244,904, filed on Oct. 5, 2005, now Pat. No. 7,683,776, which is a continuation of application No. 10/684,583, filed on Oct. 15, 2003.

(51) Int. Cl.
*G08B 1/00* (2006.01)

(52) U.S. Cl. ............ 340/531; 340/506; 340/539.1; 340/539.11; 340/3.1

(58) Field of Classification Search ............ 340/506, 340/531, 539.1, 539.11, 3.1, 825.36, 825.49, 340/539.25
See application file for complete search history.

(56) References Cited

U.S. PATENT DOCUMENTS

| | | |
|---|---|---|
| 4,551,719 A | 11/1985 | Carlin et al. |
| 4,910,659 A | 3/1990 | Gates et al. |
| 5,225,997 A | 7/1993 | Lederer et al. |
| 5,400,246 A | 3/1995 | Wilson et al. |
| 5,410,717 A | 4/1995 | Floro |
| 5,552,776 A | 9/1996 | Wade et al. |
| 5,561,817 A | 10/1996 | McCormack et al. |
| 5,644,730 A | 7/1997 | Fayfield |
| 5,780,782 A | 7/1998 | O'Dea |
| 5,793,125 A | 8/1998 | Tamg |
| 5,829,341 A | 11/1998 | Lin et al. |
| 5,917,405 A | 6/1999 | Joao |
| 5,959,529 A | 9/1999 | Kail, IV |
| 6,031,455 A | 2/2000 | Grube et al. |
| 6,131,040 A | 10/2000 | Knutila et al. |
| 6,282,469 B1 | 8/2001 | Rogers et al. |
| 6,343,255 B1 | 1/2002 | Peek et al. |
| 6,392,557 B1 | 5/2002 | Kreuter |
| 6,418,499 B1 | 7/2002 | Korowitz et al. |
| 6,430,485 B1 | 8/2002 | Hullinger |
| 6,466,138 B1 | 10/2002 | Partyka |
| 6,496,892 B1 | 12/2002 | Lake et al. |
| 6,542,077 B2 | 4/2003 | Joao |
| 6,553,336 B1 | 4/2003 | Johnson et al. |
| 6,556,843 B1 | 4/2003 | Okumura |
| 7,683,776 B2 * | 3/2010 | Glenn et al. ............ 340/531 |
| 2001/0006902 A1 | 7/2001 | Takafumi |
| 2002/0050931 A1 | 5/2002 | Lieberman |
| 2002/0065044 A1 | 5/2002 | Ito |
| 2002/0065631 A1 | 5/2002 | Loechner |
| 2002/0075163 A1 | 6/2002 | Smith et al. |

(Continued)

*Primary Examiner* — Daryl Pope

(57) ABSTRACT

A server system for remote monitoring includes a wireless communication interface, a processor, and a storage device. The wireless communication interface receives at least one data packet over wireless communications from a remote monitoring system. The processor processes the data packet including sensor information from a sensor coupled to the remote monitoring system. The storage device stores the sensor information.

22 Claims, 9 Drawing Sheets

U.S. PATENT DOCUMENTS

| | | |
|---|---|---|
| 2002/0169912 A1 | 11/2002 | Mills et al. |
| 2002/0196160 A1 | 12/2002 | Hilleary |
| 2003/0009313 A1 | 1/2003 | May et al. |
| 2003/0016142 A1 | 1/2003 | Holmes et al. |
| 2003/0067889 A1 | 4/2003 | Petite |
| 2003/0133262 A1 | 7/2003 | Minne |
| 2004/0090950 A1 | 5/2004 | Lauber et al. |
| 2005/0083197 A1 | 4/2005 | Glenn et al. |
| 2006/0028335 A1 | 2/2006 | Glenn et al. |
| 2006/0028336 A1 | 2/2006 | Glenn et al. |

* cited by examiner

FIG. 5

CUSTOMER LIST

| CUSTOMER NAME | ACCOUNT NO. |
|---|---|
| COMPANY A | 000001 |
| COMPANY B | 000002 |
| COMPANY C | 000003 |
| COMPANY D | 000004 |
| COMPANY E | 000005 |
| COMPANY E | 000006 |

FIG. 6

CREATE CUSTOMER ACCOUNT

| | |
|---|---|
| Account Number | 000001 |
| Company Name | Company A |
| Company Site ID | [102] —98 |
| Enabled/Disabled? | Enabled —100 |
| Address #1 | [1223 Main Street]* |
| Address #2 | [ ] |
| City | [Anywhere]* |
| State | [California ▼]* |
| Zip | [90210]* |
| Phone #1 | [777-555-1212]* |
| Phone #2 | [ ] |
| Fax | [777-555-1213]* |
| URL of Company Logo | [http://www.companya/companya.gif] —108 |

Address fields grouped —102

Comments:

[                                    ] —110

[Save]

FIG. 7

I. ACCOUNT SUMMARY
Company A
Account # 000001
Edit Company Information | Edit Current User | User List | Add New User | Invoices | Log Out

II. UNIT MEASUREMENT SUMMARY INFORMATION

View in MS Excel*
Refresh Page

| Unit ID or Name [sort] | Location ▽ [sort] | Element | Measured ▽ [sort] | Last Updated | Level** | Alarm Level | Details | View History* | Edit |
|---|---|---|---|---|---|---|---|---|---|
| 11A1/C Probe/ 4 Inch. | Homeland-14S Alfalfa Linear C-Probe | Moisture | | 9/23/2003 1:15:57 PM | 60.12 | Disable | GO! | 1 Day ▼ GO! | GO! |
| 11A2/C Probe/ 8 Inch. | Homeland-14S Alfalfa Linear C-Probe | Moisture | | 9/23/2003 1:15:57 PM | 80.63 | Disable | GO! | 1 Day ▼ GO! | GO! |
| 11A3/C Probe/ 12 Inch. | Homeland-14S Alfalfa Linear C-Probe | Moisture | | 9/23/2003 1:15:57 PM | 79.23 | Disable | GO! | 1 Day ▼ GO! | GO! |
| 11A4/C Probe/ 16 Inch. | Homeland-14S Alfalfa Linear C-Probe | Moisture | | 9/23/2003 1:15:57 PM | 76.69 | Disable | GO! | 1 Day ▼ GO! | GO! |
| 11A5/C Probe/ 24 Inch. | Homeland-14S Alfalfa Linear C-Probe | Moisture | | 9/23/2003 1:15:57 PM | 67.58 | Disable | GO! | 1 Day ▼ GO! | GO! |
| 11T1/Enclosure Temperature | Homeland-14S Alfalfa Linear C-Probe | Temperature | | 9/23/2003 1:15:57 PM | 49°C | 50°C | GO! | 1 Day ▼ GO! | GO! |
| 11V1/Battery Voltage | Homeland-14S Alfalfa Linear C-Probe | Voltage | | 9/23/2003 1:15:57 PM 13.5 Volts | 11.25 Volts | | GO! | 1 Day ▼ GO! | GO! |

View Disabled Only
View in MS Excel*
Refresh Page
Add New Unit

FIG. 8

1. UNIT DETAIL INFORMATION

- Device ID — 138 — V1
- Radio ID — 140 — 1001011
- Unit ID or Name — 142 — 11V1/Battery Voltage
- Location — 144 — Homeland-14S ALFALFA Linear C-Probe
- Address — 146 — ,CA
- Coordinates — 148 — N35.92697 W119.55807
- Element Measured — 150 — Voltage
- Capacity of Element — 152 — 15 Volts
- Low-end Adjust — 154 — 15 Volts
- Alarm Setting — 156 — Equal to or below 11.25 Volts
- Inactivity Alarm Setting — 1 Day with no activity.
- Monthly Fee for this Unit — $20
- Comments:

10 Most Recent Reading For This Unit

| Last Updated | Unit Level** |
|---|---|
| 9/23/2003 1:30:32 PM | 13.5 VoltS |
| 9/23/2003 1:15:57 PM | 13.5 Volts |
| 9/23/2003 1:15:57 PM | 13.5 Volts |
| 9/23/2003 1:01:22 PM | 14.2 Volts |
| 9/23/2003 12:46:48 PM | 14 Volts |
| 9/23/2003 12:32:13 PM | 13.5 Volts |
| 9/23/2003 12:17:38 PM | 13.5 Volts |
| 9/23/2003 12:03:04 PM | 13.5 Volts |
| 9/23/2003 11:48:29 AM | 13.5 Volts |
| 9/23/2003 11:33:54 AM | 13.5 Volts |
| 9/23/2003 11:19:19 AM | 13.5 Volts |

**Unit levels shown in red are at or below this unit's designated alarm level.

FIG. 9

Company A

I.  EDIT UNIT INFORMATION

\* = Required Field

| | |
|---|---|
| Device ID | [V1]* —138 |
| Radio ID | [1001011]* —140 |
| CustomerRadio ID | [25211]* —158 |
| Unit ID or Name | [11V1/Battery Voltage] —142 |
| Location | [Homeland-14S Alfalfa Linear C-Probe]* —144 |
| Address | [ ] |
| City | [ ] |
| | —160 |
| State | [California ▼] |
| Zip Code | [ ] |
| Coordinates | [N35.92697 W119.55807] —148 |
| Element Measured | [Voltage]* —150 |
| Unit of Measure for Element | [Battery Voltage ▼]* |
| Capacity for Element | [15]* —152 |
| Low-end Adjustment (Cannot exceed capacity of element) | [0] —164    150 |
| Reading at Minimum | [0]* —166 |
| Reading at Maximum | [15]* —168 |
| Alarm Setting | [75% ▼]* —156 |
| Alarm Triggered When Measurement is Equal To or | ○Above Setting ●Below Setting —170   172 |
| Inactivity Alarm Setting | [1]* day(s) with no reported activity (-365.0 = Disabled) |
| Is This Unit Enabled? | [Yes ▼]* —174 |

Comments: —144

[ scrollable text box ]

[Save Unit]

SERVER SYSTEM FOR REMOTE MONITORING

CROSS-REFERENCE TO RELATED APPLICATIONS

This application is a continuation and claims the priority benefit of U.S. patent application Ser. No. 11/244,904 filed Oct. 5, 2005 now U.S. Pat. No. 7,683,776, which is a continuation and claims the priority benefit of U.S. patent application Ser. No. 10/684,583 filed Oct. 15, 2003, the disclosures of which are hereby incorporated by reference.

BACKGROUND OF THE INVENTION

1. Field of the Invention

The present invention relates generally to monitoring conditions. More particularly, the present invention relates to the ability to monitor environmental conditions at a site with increased reliability and accuracy as well as the ability to access real-time data from a remote location.

2. Description of the Related Art

In this age of modern electronics, there is an ever increasing need to monitor areas, devices and/or conditions in the event that an "emergency" condition occurs. For example, with mechanical devices, there is a high likelihood that the device will eventually malfunction. Knowing the occurrence of this event as soon as possible can save one millions and millions of dollars. In the event that the "emergency" event occurs, the appropriate personnel can be dispatched to remedy the malfunction or function.

Many times, monitoring the assets or conditions occurs in remote locations, where it is not feasible to have an individual or personnel to keep a check on the device. In the instance where personnel are used to monitor these conditions, it is usually set up on a schedule. The disadvantage with such a system is that the personnel could check the equipment and render it operable and in return have the equipment malfunction shortly after the personnel has left. The malfunction is then not detected until the personnel returns, which could be an extended period of time. In addition to monitoring equipment for possible malfunction or failure, it is becoming increasingly important to gather data from environmental sensors on a regular basis in some cases one-quarter hour intervals. In this situation it is impractical to have personnel on site to accomplish this task.

Another disadvantage with individual site checking is the amount of time and resources needed. Additionally, the system is unreliable because there is never constant monitoring, which means that there is a very good probability that the device or condition is not detected for a length of time that might be very crucial.

In order to combat these problems, devices have been introduced in an attempt to achieve more constant monitoring. Such devices include a camera or data logger placed at the remote site. However, the problem with this solution is that it requires an individual to monitor the camera or to show up on site to download the data logger in an attempt to identify the problem or collect the environmental data. Additionally, the camera is not always able to detect internal problems which are not visible. Information obtained from the data logger is much too latent to deal with a problem in a timely fashion.

Other solutions to this problem include linking the device or site to be monitored with a computer. More specifically, a data collector is placed at the device and/or site and monitored in order to detect any "emergency" conditions. The sensor, in this instance, is hardwired to the computer. With such an arrangement, the use of this solution is limited by the availability of power for the computer. Another downside to such an arrangement is the ability to remotely monitor assets such as pipelines or storage tanks where commercial power is not available. Therefore, this solution is limited by the availability of commercial power and the limited tether capability of the remote sensors.

Another problem with the current products are the types of sensors being employed. In such a setup, the sensors are generally analog in nature. There is virtually no ability to use other types of sensors along with these analog sensors. The analog sensors usually allow only one-way communication, which prevents the computer from analyzing and controlling the sensors. The sensor only has the ability to collect the data and transmit it back to the computer.

Additional prior art solutions to remote monitoring is the placement of an on site power source such a generator, which is placed for the sole purpose of providing a more consistent monitoring of the site and/or device. However, this solution has a number of drawbacks. For example, the generator and the fuel for the generator would need to be replaced as often as needed. As one can imagine, this solution, though more reliable, would require resources that are cost prohibitive, while at the same time does not provide the constant monitoring needed. A user of this solution would still need to employ personnel to maintain and fuel the generator system.

Even with a device where power can be maintained on a consistent basis, there is the problem of retrieving the data from the remote sites. For example, if a company wanted to monitor an oil pipeline, a grain storage facility, or a volumetric moisture environmental sensor, then an on-site monitoring system would need the capability to transmit the data back to the home base where it is then used to detect "emergency matters." However, this is not always feasible because of the inability to communicate this data from the remote location to a location to where it can be monitored.

Some of the prior art solutions to this problem have been to use circuit switched cellular connections in order to retrieve the sensor data. The sensor is attached to a computer, which is then attached to a circuit switched cellular transmitter. The data is transmitted into a wireless network where it is ultimately transmitted to the final location to be monitored. Problems with this technology is that each data transmission is set up like a conventional cellular voice phone call. This forces the user to pay large cellular bills to transmit a very limited amount of information. Most Cellular Services charge a 1 minute minimum and round up to the nearest minute. It is also possible that cellular coverage in rural areas is limited.

Solutions to the lack of reception is the addition of cellular transmitting towers. However, this is not a viable economic solution to most individuals. Another disadvantage of some wireless technology is the associated cost to use the airtime. For example, if the device collects data repeatedly through an hour or day, this data must be sent back to the base station to where it is collected and assembled. Each time the cellular modem is dialed into its ISP the "clock is running and cost begins to accumulate, which can become substantial over time. With the current sensors, such as analog, each sensor transmits the data as it is collected. Therefore, a system that has eight sensors would almost be in a constant transmitting mode on the circuit switched cellular technology Another problem with the prior art is the ability to efficiently collect the data. In the prior art, the information is forwarded to a location where it is stored so that it can then be analyzed. Upon analyzing the data, an individual makes a decision whether to send out an alert message. When the message is dispatched, then the appropriate action is taken. Additional restrictions on the prior art solutions to the collection of the data are that it must be seen or analyzed from a central location. Those individuals that need to monitor the data need to be in this central location in order to monitor the data. Additionally, the data collected may not on a real-time basis, which can have serious implications.

Accordingly, it is desirable to provide a method and apparatus that enables one to monitor assets and/or conditions with a plurality of sensors. The method and apparatus can communicate with these sensors with relative ease. Furthermore, there is a desire to place these sensors in locations where access to traditional power and communication lines is virtually non-existent. There is a further need to be able gather and track this information in an efficient manner. In tracking this information, the ability to monitor the data, as it is collected, needs to be available to anyone regardless of their location.

SUMMARY OF THE INVENTION

The invention addresses the problems above by providing a server system for remote monitoring. In accordance with one embodiment of the present invention, the server system includes a wireless communication interface, a processor, and a storage device. The wireless communication interface receives at least one data packet over wireless communications from a remote monitoring system. The processor processes the data packet including sensor information from a sensor coupled to the remote monitoring system. The storage device stores the sensor information. The processor may generate a polling message and the wireless communication interface may transmit the polling message to the remote monitoring system to initiate collection of the sensor information. The processor can assign an identifier for the remote monitoring system. The processor can also control activation of the remote monitoring system.

The processor may also display a location of the remote monitoring system, the sensor information, and time and date of the sensor information through a graphical user interface. The processor may determine whether an alarm level is triggered based on the sensor information. The processor can then send a message to a user based on a positive determination that the alarm level is triggered.

In accordance with yet another embodiment of the present invention, a method for operating a server system for remote monitoring includes the steps of receiving at least one data packet over wireless communications from a remote monitoring system into a wireless communication interface, in a processor, processing the at least one data packet including sensor information from a sensor coupled to the remote monitoring system, and storing the sensor information in a storage device.

In accordance with yet another embodiment of the present invention, a software product for a server system for remote monitoring includes server software and a software storage medium operational to store the server software. The server software is operational when executed by a processor to direct the processor to receive at least one data packet from a wireless communication interface and process the at least one data packet including sensor information from a sensor coupled to a remote monitoring system.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is a display of a screen shot illustrating the capabilities of a computer database, which includes the remote site monitoring device data in accordance with the present invention.

FIG. 6 is a display of an additional screen shot illustrating customer creation portion of the database where the remote site monitoring device data is stored and accessible by an individual in accordance with the present invention.

FIG. 7 is a display of an additional screen shot illustrating a customer's remote sensor listing that is stored on a computer database in accordance with one embodiment of the present invention.

FIG. 8 is a display of an additional screen shot illustrating a customer's remote sensor information that is stored onto a computer database in accordance with one embodiment of the present invention.

FIG. 9 is a display of an additional screen shot illustrating an editing process for a customer's remote sensor information that is stored onto a computer database in accordance with one embodiment of the present invention.

DETAILED DESCRIPTION

Figure 1:
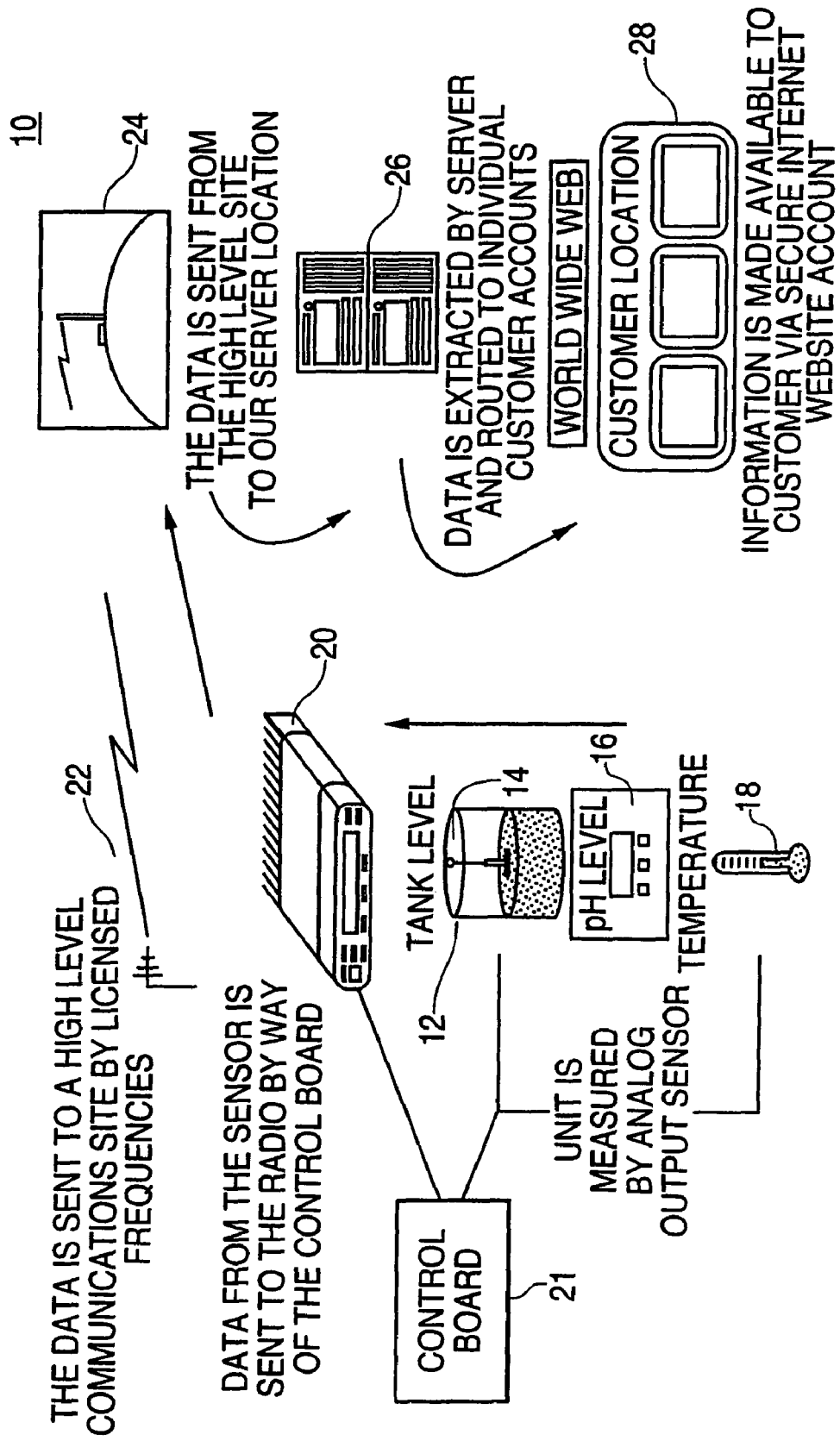
FIG. 1 is an illustration of the overall invention according to one embodiment of the present invention.

The invention will now be described with reference to the drawing figures, in which like reference numerals refer to like parts throughout. An embodiment in accordance with the present invention provides a method and apparatus that permits remote site monitoring regardless of the location of the device or activity desired to be monitored. Furthermore, the method and apparatus permits one to use any number of different types of sensors such as analog or digital. The data collected from these sensors is compiled in an efficient and effective manner such that minimal resources are required of the remote site device. Additionally, the information is made available such that it can be accessed remotely and can automatically be monitored with alarms generated at preset levels or intervals.

An embodiment of the present inventive apparatus and method is illustrated in FIG. 1. FIG. 1 is an illustration of one embodiment in accordance with the present invention that details the overall configuration 10 of the preferred embodiment. A business or individual selects a device or activity that they desire to be monitored for a particular reason. In this figure, the company has desired to generally measure the conditions in a tank 12. More specifically, the company has chosen to monitor the tank level 14, the acidity or the ph level 16 and the inside temperature 18 of the tank 12. In this instance, the preferred embodiment is incorporating the use of individual sensors to measure each of the specific type of data.

The advantage of measuring the remote device is the achievement of constant monitoring with minimal resources. By achieving such a method or apparatus, the company is able to react in a timely manner in order to conserve resources and also avoid potential larger than needed disasters or accidents.

The data is collected from a remote sensor 14, 16 or 18. The data comprises information from all the attached sensors and is compiled into a packet, single or otherwise, such that it reduces the bandwidth necessary for transmission of the message.

The packet of data is passed to a wireless device such as a telemetry radio 20 from the control board 21. From here, the data is then transmitted 22 to another location or remote location 24 such as a server 26. The control board 21 is a microprocessor controlled device that is linked to the sensors. The control board 21 is a point to which the data is initially sent to and from the sensor. The control board 21 is also the location where the data is collected and processed for transmission to a remote location 26.

The preferred embodiment uses a telemetry radio device 20, which is connected or linked to the control board 21. From this point, the telemetry radio usually transmits the data to another location 24. The receiving unit at these locations 24, 26 can be a telemetry radio 20 or a General Packet Radio Service (GPRS)/Global System for Mobile Communication (GSM) gateway that allows the data to be passed as a User Datagram Protocol (UDP) message to the server 26 via the Internet. As another option the receiving unit can be hardwired to a server 26. In most instances, the telemetry system is set-up such that there is limited obstruction with locations 24, 26. Care is taken to ensure the continuance and reliability of the monitoring by ensuring minimal to no obstruction with the telemetry radio signal.

After the data is transmitted to the locations 24, 26, and on to the server 26, it can be stored either on a temporary or permanent basis. At some point in time, the data can be forwarded to another server or personal computer where it may be stored or viewed. In the preferred embodiment, the location is a microprocessor based server 26 that collects and compiles information from a plethora of sensors.

The data is compiled at the remote site into a single data packet. The packet contains all the information for all of the sensors that are attached to that control board 21. In the preferred embodiment, the packet is disassembled and the information stored at the server level. The preferred embodiment stores the data on a sensor by sensor basis. Prior to any transmission from the remote site, the sensors are each given a unique code or identifier. The unique codes are located throughout the data so that when the data is disassembled or decompressed, the server 26 is aware of which piece of data belongs to which sensor at which location.

The data, in the preferred embodiment, contains or includes specific data. Such data must include the sensor reading, the unique identifier of the sensor and the device (station) identifier. Additional data may include location of the remote device, date and time of the sensor reading, the number of retries required to obtain confirmation from the server 26, and the status of the telemetry radio 20. It should be noted that the date and time stamp can be applied at the server 26 or at the control board 21 level.

Once the data is decompressed or disassembled at the server 26, the data is made available through the Internet or another access point 28. In particular, the company or one designated to monitor the data is able to access that data that is extracted from the sensors. Additionally, the server 26 allows the company to define alarm points or levels. For example, if the temperature reaches a pre-selected limit of 100 degrees Fahrenheit, then an alarm is generated to alert of the condition. To determine the existence of a possible alarm, the server 26 completes a comparison of the sensor reading with the pre-selected alarm point or level. If the comparison generates a level that is above or below the pre-selected level, then the alarm warning is generated.

The logical function used to perform the comparison is user dependent. The preferred embodiment allows the user to select from an upper or lower limit as well as user defined equation or algorithm. Alternate embodiments allow the use of Boolean logic and other logical functions to manipulate the data in order to arrive at the determination of whether an alarm point or level has taken place or exists.

A preferred embodiment of the invention generates a message that is electronically transmitted to a pre-designated source. The message can be an e-mail, a pre-recorded voice mail message or an audible or visual warning. An alternate embodiment includes instructional codes that are transmitted to the remote site. These codes can be to correct or remedy the situation or can include shutting down of the equipment to prevent further damage from taking place.

The data is stored on the server 26 such that the end user can view the data on a historical perspective. In this instance, the data can be shown in numerical or graphical format. A historical perspective allows the user to assess the data over an extended period of time and aid in the determination of whether a problem is developing with the on-site equipment. Single data views make this a more difficult task.

As previously stated, the data can be retrieved through an access point 28 made available on the server 26. In the preferred embodiment, the access point 28 can be accessed from almost any location. The server 26 and the access point 28 associated therewith are connected to a computer network. Anyone with access to this network can also gain access to the server 26 and the data stored thereon. However, in view of today's need for security of the server 26 and the information stored thereon, a security procedure is needed to be successfully performed before access of the server 26 is permitted.

Figure 2:
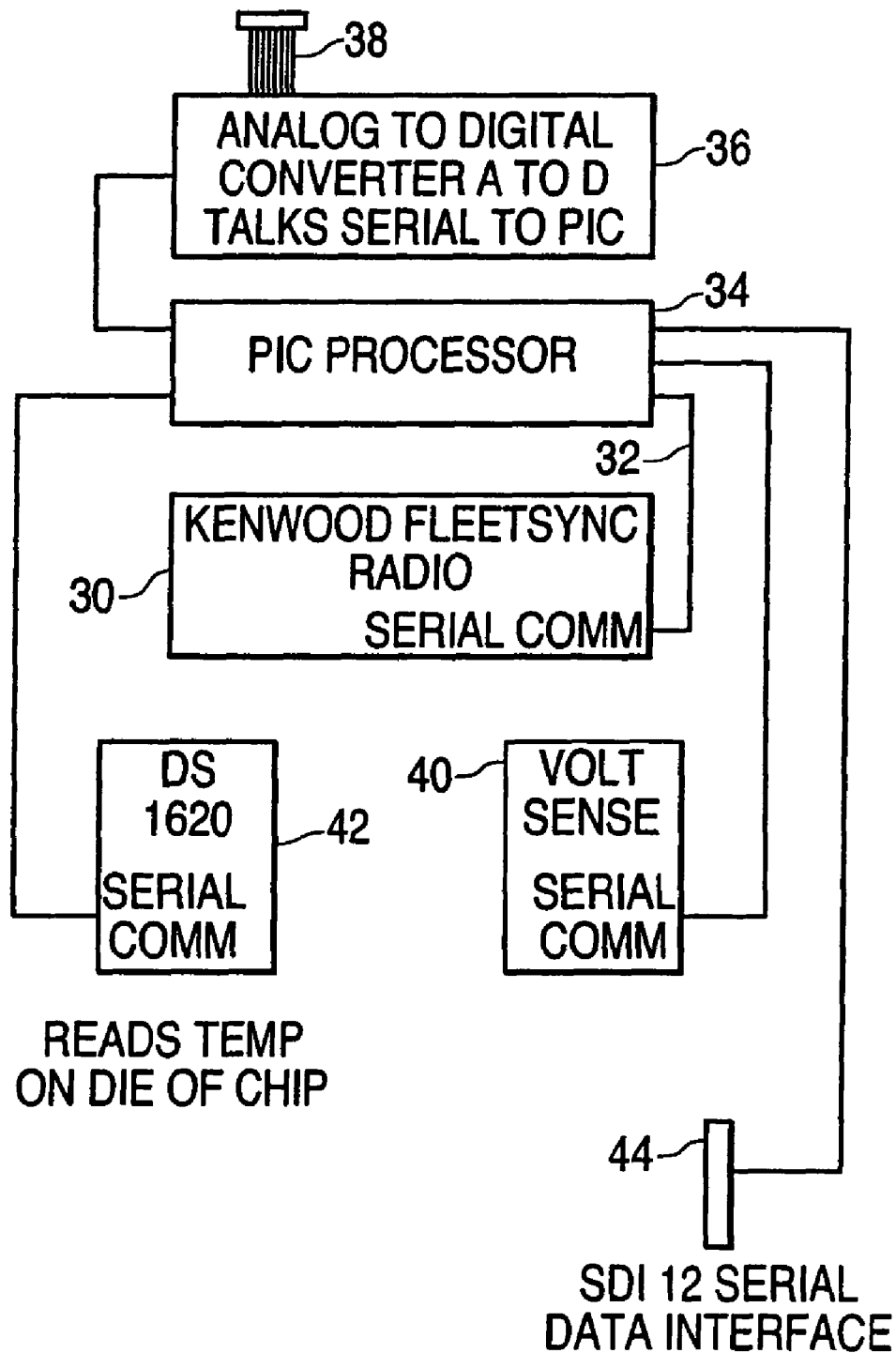
FIG. 2 is a block diagram of a receive and transmit telemetry radio in accordance with one embodiment of the present invention.

FIG. 2 is a block diagram of a complete remote telemetry unit in accordance with one embodiment of the present invention. In this figure, the base of the invention is a telemetry radio 30 with serial communications 32 to a linked microprocessor based control board 21. This embodiment uses a Kenwood Fleetsync Radio, which is model number TK 880, a mobile phone. In alternate embodiments, the telemetry radio 20 can be the Kenwood Fleetsync Radio TK 380, which is a portable device or any other communication device with a packet modem. The Kenwood radios include a twenty four hundred (2400) baud modem in order to effectuate transfer of the data.

Additional alternate embodiments of the present invention also can be a General Packet Radio Service (GPRS) modem. In this alternate embodiment, the GPRS is made by Enfora and is mode number Spider SAG. GPRS is a Global System for Mobile Communication (GSM) transmission technique that does not set up a circuit switched connection (continuous channel or dial up connection for the transmission and reception of data), but transmits and receives data in packets on a close to real time basis. This technology makes very efficient use of available radio spectrum, and users generally pay only for the volume of data sent and received. GSM is a standard for digital cellular communications and is in the process of being adopted by over 60 countries. The GSM standard is currently used in the 800, 900 MHz and 1800 MHz bands.

The telemetry radio 30 is linked to a control board 21 using a microprocessor 34, which in this embodiment is made by Parallax and is in the BS2 family. The processor 34 is configured such that it is compatible with the varying protocols of sensors currently and prospectively in the market place. The benefit of the single processor design is that it allows a single component to be used. Another benefit is the ability to address various types of sensor in a single device.

The digital sensors may be SDI-12, RS-232, RS-432 or I2C along with other types. SDI-12 is a protocol standard that interfaces a battery powered data recorder with a microprocessor based sensors designed primarily for the acquisition of data. The data being collected, in the preferred embodiment, is usually of an environmental nature. It is possible to use the sensors to collect many different types of data in addition to the environmental data.

Data acquisition is accomplished by a sensor connected to a control board 21 with a microprocessor 34. Part of the control board may be a data recorder. The data recorder can collect data that has not been confirmed by the sever. The control board 21 is able to determine when the server 26 becomes available and then forwards the stored data at that time. The control board 21 provides means to transfer measurements obtained from the sensor to the data recorder (either on the control board or external to the control board 21. The sensor generally takes a measurement, and the control board 21 makes computations based upon the raw sensor reading and outputs the measure data in a format of a particular measurement. For example, if the sensor measures temperature, the particular measurement can be in Fahrenheit, Celsius or Kelvin or a raw number to be converted at the server. If the sensor collects pressure measurements, then the returned format of measurement can be but not limited to torrs, bars, inches of mercury and pressure per square inch (psi).

In order to make these conversions, the sensor needs to have the capability. SDI-12 sensors generally have microprocessors that enable them to efficiently and effectively handle these computations. Normal analog sensors typically do not have the capability to take raw data measurements and proceed to convert the data into the necessary units.

The use of the SDI-12 sensors for data acquisition have a further benefit in that calibration and/or control of the sensor is achieved more easily. This is generally done by downloading executable software code into the sensor. The executable code can instruct the sensor to take measurements and control timing. It can further instruct the sensor to convert the raw data into a specific unit of measurement. Another advantage of the SDI-12 sensor is the ability to use more than one type of sensor on a single data recorder. Furthermore, it is possible to have sensors on a single data line that can collect varying types of environmental data such as pressure, temperature, acidity levels, liquid level, battery voltage and so on.

In a preferred embodiment, multiple types of sensors (i.e. digital and/or analog) are used. Current systems in such arrangement require the user to incorporate a different modules or boards for each of the varying types. As a result, the remote site monitoring device begins to consume more power in a scenario where consumption of power is critical to achieve the ultimate goal of uninterrupted monitoring. This arrangement begins to limit the number of on-site configurations that are available with a single remote site monitoring device. The preferred embodiment incorporates the use of a single board in which different types of sensors can be employed.

Referring back to FIG. 2, the processor 34, in alternate embodiments, can be programmable logic controls (PLC) or field programmable gate arrays (FPGA). This configuration provides a great deal of flexibility in updating or upgrading the computer chip. As improvements or different configurations are needed, the software code is downloaded into these chips rather than having to complete a chip replacement in the instance of a microprocessor. In the preferred embodiment, software code is downloaded into the processor 34 in order to effect a process.

Also connected or linked to the processor 34, as part of the control board 21, is an analog to digital converter (ADC) 36. The ADC 36, itself, is connected to the analog sensors 38. In the preferred embodiment, optimal performance was achieved with eight channel ADC. The number of sensors, however, can be increased or decreased in alternate embodiments.

The analog sensors 38 obtain sensor readings. These might be a pressure, volume, and a temperature reading among others. Due to the nature of the analog sensor, the reading obtained is in the form of a waveform. This voltage waveform is then transmitted to the ADC 36, where it is transformed into digital format so that it can be read and processed by the microprocessor 34.

The preferred embodiment also includes linking a voltage sensor 40 to the microprocessor 34 through a serial communication port on the microprocessor 30. The sensor 40 is connected to the battery that powers the complete remote site monitoring device. Each time a data packet is transmitted from the remote site monitoring device, a battery reading is included so that the user can initiate remedial measures upon the detection of a problem.

An additional serial port on the microprocessor 34 serves as the location to where a temperature sensor 42 is linked. A temperature sensor 42 is placed near or on the microprocessor 34. The temperature sensor 42 measures the ambient temperature around the microprocessor 34, which helps to avoid identifying excessive heat that can affect the chip's performance. This temperature reading is also sent in the data packets that are transmitted to the base station.

For both the voltage 40 and temperature 42 readings, the preferred embodiment obtains a sensor reading and includes it with each data sensor packet. In alternate embodiments, the frequency of the transmission can be scheduled hourly, daily or weekly transmission. In fact, it is possible to instruct the microprocessor 34 to obtain and transmit the reading on any user defined time-table.

Again, referring back to FIG. 2, the processor 34 is linked or attached to an SDI-12 interface 44. This single wire interface, in the preferred embodiment, allows the connection of multiple sensors. Depending on the manufacturer and type of the SDI-12 sensor, adding large numbers of sensors to the line may have an affect on the performance of the system.

In the preferred embodiment, a system is set up such that the sensors take measurement during periodic cycles. The data is passed onto the processor 34 to where it is placed in a queue. The queue, after some point in time, either immediately or some time after, passes the data off to the telemetry radio 30 for transmission to an off-site or remote location such as the base station or GPRS/GSM Gateway.

At the point the data from the various sensors is passed on to the processor 34, the processor 34 begins to compile the data into an efficient and effective format. Because power consumption and radio bandwidth are key concerns at the remote site location, manipulation of the data by the processor is kept low or to a minimum.

The processor 34 receives the data and begins to compile it into a format. Initially, a unique identifier is attached to the data. There is a unique identifier associated with each of the different sensors. For example, if the remote site monitoring device has a plurality of sensors measuring temperature, pressure, liquid and acidity level, then each sensor is assigned this unique ID. The temperature sensor might be T1, the pressure might be P2, the liquid level might be L1, and the acidity level PH1. Therefore each measurement is attached with its respective unique level.

After all the sensor data is collected, all of the data is compiled or encapsulated into a single data packet. In the preferred embodiment, the packet length is generally no longer than ninety-six bytes. Alternate embodiments of the present invention can have the packet length generally no longer than five-hundred and twelve bytes or at almost any conceivable byte length. The present invention is not limited by the specific byte lengths stated herein. Again, the packet is preferably held to a small length due in most part to the power consumption requirement and the necessity to keep air time usage to a minimum. The packet is combined with a header and then the sensor data. In alternate embodiments, the data can be transmitted on a sensor by sensor basis. In other words, if there are ten sensors, there could be ten individual sensors transmissions but this embodiment can lower the overall airtime and power efficiencies.

The data packet, as discussed, is transmitted to a remote location 24 or 26 to where it is then disassembled or unencapsulated. The remote station, in the preferred embodiment, is a base station or GPRS/GSM gateway. The data message is sent to the server 26, which parses and stores the message, usually based upon each uniquely identified sensor.

In the preferred embodiment, this information is brought down to a central location where it is stored and made available for retrieval or access. The data from the base station can be brought down, via telemetry radio, land telephone line, wireless technology such as cellular and satellite. The base station usually doesn't have the same power or consumption limitations as the remote site monitoring devices. Therefore, the options for forwarding of data are more plentiful.

The wireless system in the preferred embodiments is a telemetry radio or a GPRS/GSM packet modem device. These devices are powered and operated through the use of solar panels and rechargeable battery technology.

Figure 3:
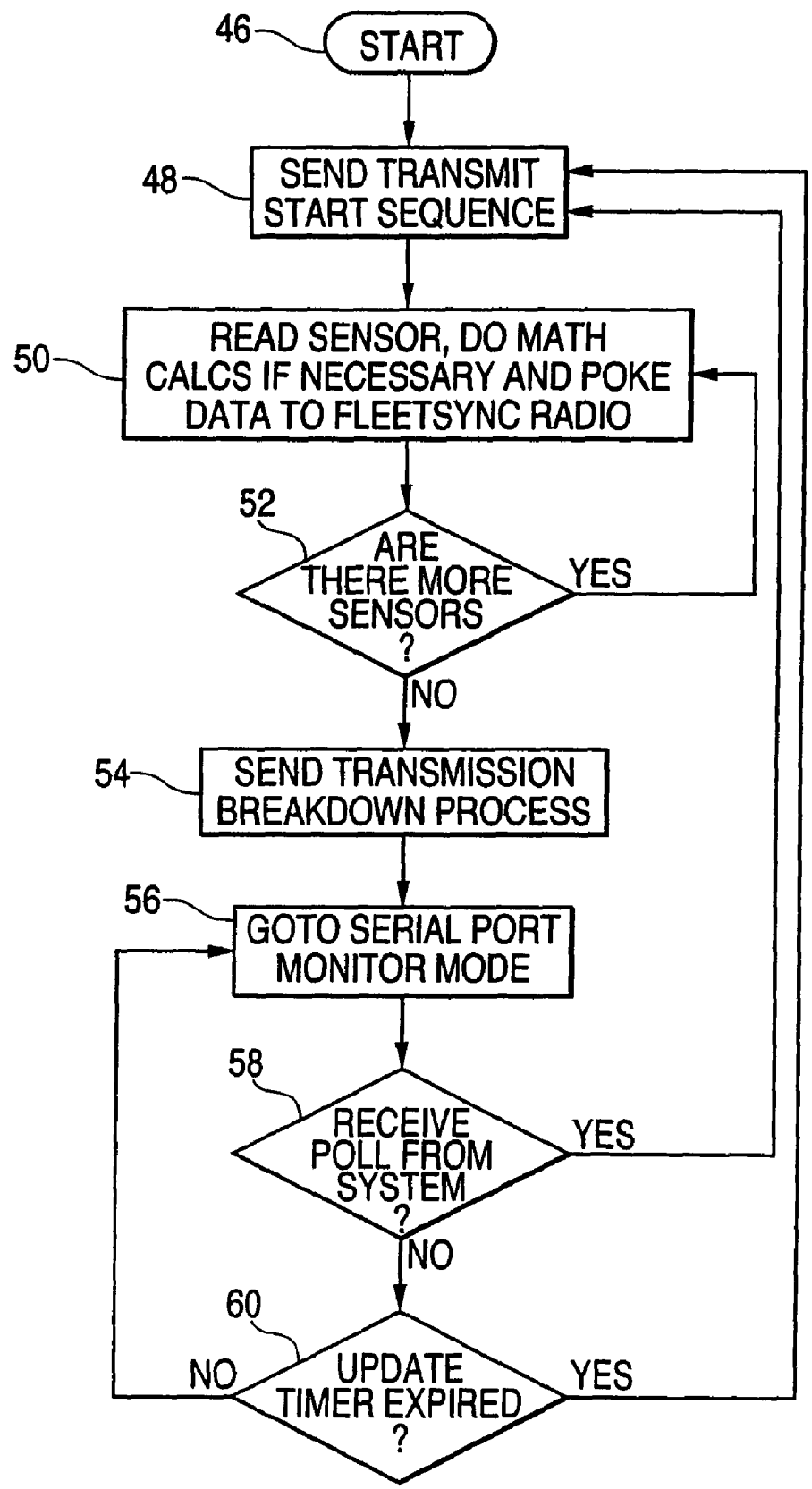
FIG. 3 is a flowchart illustrating steps that may be followed in accordance with one embodiment of the method or process.

FIG. 3 is a flowchart illustrating steps that may be followed in accordance with one embodiment of the method or process of the present invention. More specifically, FIG. 3 details the process at the remote site monitoring device. The remote site monitoring device begins 46 the process with the step 48 of sending of a transmit start sequence. This is actually accomplished by the microprocessor 34. The microprocessor 34 sends a start sequence to the telemetry radio. Next, the sensor gathers data and transmits it back to the microprocessor 34. Additionally, in step 50, the preferred embodiment performs calculations on the applicable sensors. In the preferred embodiment, data in the rawest format is transmitted to the radio and math calculations are accomplished at the server 26. In many situations, it may be desired that the raw data be converted prior to transmission to the server 26. Application of either embodiment is correct although multiple math calculations at the remote device tend to consume more power from the solar/battery system. For example, if the analog sensor is measuring battery voltage on the remote monitoring device, the data can be in the form of a waveform indicating zero to fifteen volts. However, this is converted by the ADC 36 into digital format (0-256), where it can be processed more efficiently and effectively by the processor 34. It may be advantageous to convert the raw value from a 233 to a 12.6 volts at the remote site although this will use more power and slow down the functions of the remote site.

Additionally, in step 50, the data is pushed to the transmitting device, which in the preferred embodiment is a Fleetsync Radio or and Enfora GPRS modem. At this point in time, the process begins the step 52 of searching for more sensors. If there are more sensors, the process begins itself at the step 50 and continues until all sensors have been read.

Once there are no more sensors to be read, the processor 34 completes the next step of sending a transmission breakdown process. In other words, the processor 34 has sent a signal or instruction to the Fleetsync radio or Enfora modem that there is no more data to come and instructs the unit to forward the message. Effectively, an end bit or instruction is transmitted to the Fleetsync Radio or Enfora to indicate that the data gathering has ceased for this particular cycle.

Once this happens, the processor 34 reverts or places itself into the step 56 of going into a serial port monitoring mode. At this point, the processor 34 begins to listen for a command from the server 26. The command can be a poll command or instruction to effect some other function. If the processor 34 does receive a poll from the server 26, then the process begins at the step 48 of transmitting a start sequence. In alternate embodiments, if the processor 34 does not receive a poll from the server 26, the processor is placed on a timer such that at the end of the time period, the processor 34 automatically activates the data collection process.

Another source can be a timer that takes periodic schedule sensor readings, which is the next step 60. For example, a time can be set in the control board software such that the processor 34 prompts all or certain sensors to take sensor readings every two hours. This instruction is stored by the remote site which begins to prompt itself to take the readings. Upon expiration of the two hour period, the readings are obtained after which the timer is updated indicating a reset of the timer for the next two hour period for obtaining data readings.

Figure 4:
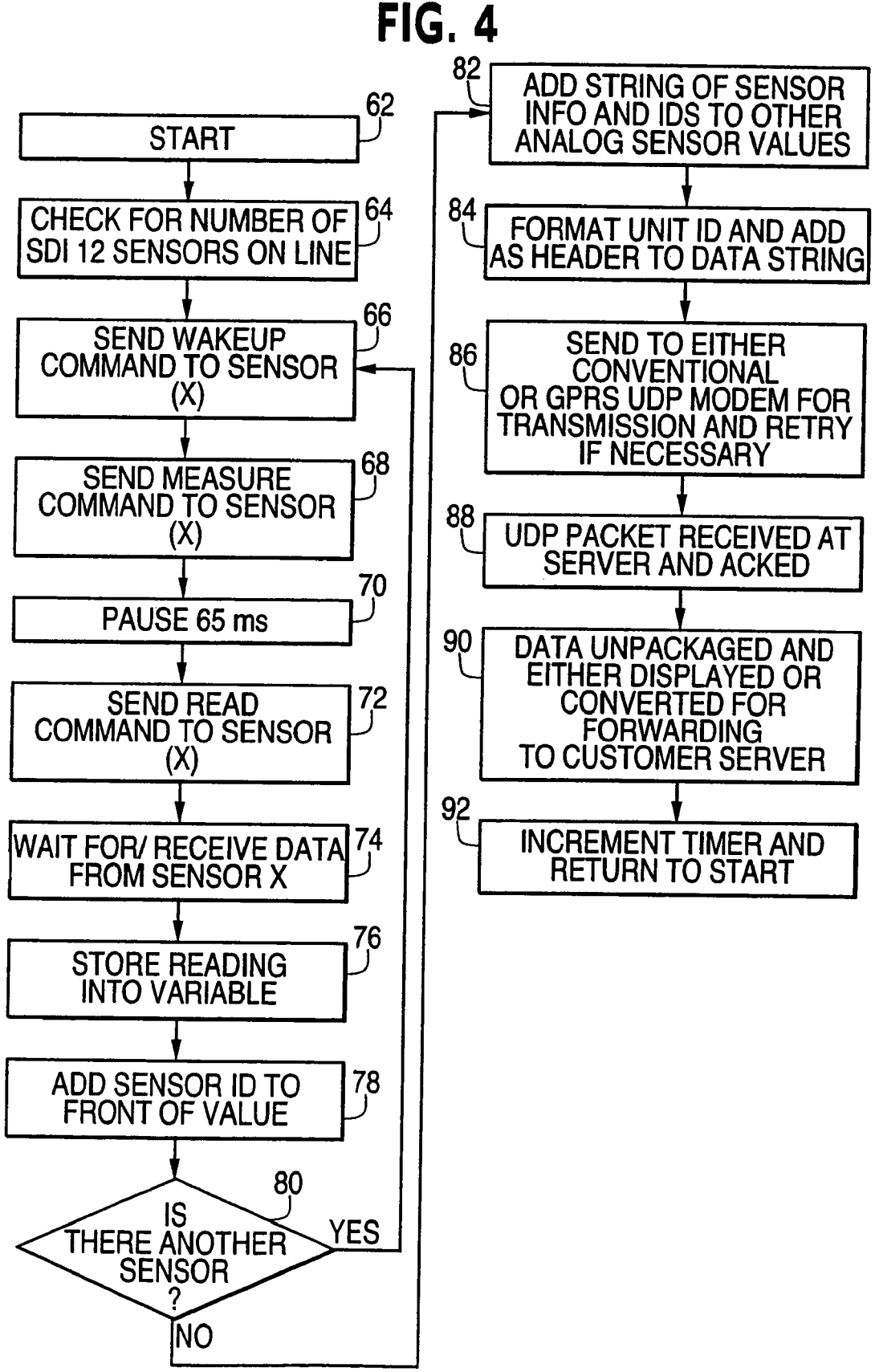
FIG. 4 is an additional flowchart illustrating steps that may be followed in accordance with another embodiment of the method or process.

FIG. 4 is an additional flowchart illustrating steps that may be followed in accordance with another embodiment of the method or process. FIG. 4 details the process of obtaining sensor readings from a digital sensor that are linked to the remote site monitoring device. The process is begun with the start step 62, which then leads to the step 64 of checking the one-wire SDI-12 line for the number of sensors connected or linked to the remote site monitoring device. Once this is begun a wakeup command 66 is then transmitted to each of the sensors. The wakeup command 66 alerts the SDI-12 sensor to be prepared for the transmittal of additional commands.

The next command transmitted to the SDI-12 sensors is the measure command 68. At this point, the sensor obtains the reading for which it has previously been set up to record. For example, if one of the sensors is set up to obtain pressure reading, the sensor obtains the current reading based on the measure command 68 from the sensor.

Depending on the SDI-12 sensor, the sensor may require a delay for it to accomplish its read. Some sensors communicate the delay time necessary others do not. In this particular example, can take up to is sixty-five milliseconds to do its read function. Upon expiration of the pause 70, a read command 72 is then transmitted to the sensor. This command instructs the sensor to obtain the current value of the sensor for transmission back to processor 34.

Upon execution of the read command 72, data begins to be received 74 at the microprocessor 34. The microprocessor 34 then takes the affirmative step of storing 76 each sensor reading into a memory device such as random access memory (RAM). To distinguish among the various sensor readings, the next step 78 in the process is to include a unique sensor identifier with each sensor reading. The process is then repeated until the beginning step 64 until there are no more sensor readings to store 76 in memory. Once there is a determination 80 that all the sensors have been read, all of the SDI-12 readings are added in the next step 82 to the sensor readings of the analog sensors. In the preferred embodiment, this could be the combination of ten SDI-12 sensors and eight analog sensors. The analog sensor data is converted by the ADC 36 into digital format for processing purposes. This conversion aids the remote site monitoring device to efficiently and effectively transmit the data.

A unit (station) ID 84 is then added as a header to the data string. The unit ID 84 is another unique identifier that represents the particular remote site monitoring device that the sensors are attached. This is more applicable to situations where the base station has more than one remote site monitoring device reporting data. This aids in sorting the data once it is unencapsulated. Otherwise, there can be confusion and processing errors if there are similar sensor names among differing remote systems.

At this point in the process, all of the sensor data is packaged and forwarded to the transmitting device. Once the transmission is made by the transmitting device, the control board 21 waits for a confirmation response for the server 26.

As stated, the packet of data is transmitted 86 to a remote location. The next step 88 in the process is the reception of the data at the server 26. The server 26 then creates an acknowledgement and transmits the acknowledgement to the remote site monitoring device. If the acknowledgement is not received, then retransmission is repeated up to (N) times until an acknowledgement is received.

The next step 90 is the unpackaging of the data packet. The packet is striped and the data is then stored in the appropriate location for access. In the preferred embodiment, the data is stored on a server 26 to where a user is then allowed access to the data. The user is also able to generate alarms and warnings based upon the sensor readings as well. Alternate embodiments also permit the data to be sent to the user. This can be in the form of an electronic message such as e-mail, but can be a letter or summary as well.

Upon reception of the data, the preferred embodiment resets the timer, which sets the next period to begin the process of gathering the data from the sensors. The time is generally set-up for a specific time period upon which the system automatically gathers the data and is eventually made available for the user. Alternate embodiments can exclude the timer and have data gathered on a polling only basis. In this instance, the server 26 is the impetus to begin the process. This alternate embodiment requires a command from the server 26 to instruct the control board 21 to begin the collection of the data. In yet another embodiment, sensor reports are only sent on an exception basis where the control board 21 makes the determination by comparing its own preset alarm levels with the sensor reading. This embodiment may consume more power form the solar battery system but will save on airtime usage.

In alternate embodiments, some of the data that is packaged at the remote site is stripped of extraneous data. In many instances, the data received from certain probes or sensing devices is transmitted back to the control board 21 with such things as commas, decimal point or negative or plus indications. The alternate embodiment eliminates or strips this data and then the data is packaged and readied for transmission. One of the reasons for stripping the data is the need to save bandwidth which equates to saving power and/or resources. With a reduced sized message, the transmission time of the transmitting device is reduced. Transmission time and frequency are a constant monitored in order to reduce them to a workable minimum.

Upon the reception of the data at the base station or server 26, the data is then readjusted such that the extraneous data is reintroduced. The alternate embodiment is able to accomplish this task due to the known abilities of certain probes. Therefore, the server 26 is aware of the type of probes attached and reintroduces or reattaches the stripped data only to those probes that introduce it to the data readings. For example, if a probe made by Company A add s decimal point to the data, then the server 26 is aware that the Company A probe is attached and reintroduces to the data at the server location.

FIG. 5 is a display of a screen shot illustrating a portion of the database where the remote site monitoring device data is stored and accessible by an individual in accordance with the preferred embodiment of the present invention. To access the data from a remote location, a user of the system enters a login screen where they are asked both for a login name and a password. The login name and the password are linked in this system to a particular person. Therefore, upon access being granted to the user, the user's remote site sensors are made available for the user to monitor or access. In an alternate embodiment, an administrator can access the system in the same manner. However, the administrator is given access to all the remote sensors as well as privileges to alter or edit the overall system.

In the preferred embodiment, the database is placed on a web-based server, which itself is connected to the Internet. Access is limited to those granted by the administrator. By placing the data on an Internet, a company, whose has sensors in the field, can access the data from virtually any location. This essentially gives the company access to real-time data.

Alternate embodiments of the present invention locate the data on the server 26. Upon reception and unpackaging of the data, the data is then routed to the designated receiver. This configuration aids the company in limiting overall theft of the data from unwanted intruders. However, the configuration may not provide information on a real-time basis.

FIG. 5 is a screen shot of what an administrator can retrieve from the database upon access to the server 26. The administrator is given a listing of all the companies or customers 94 that have accounts with Cumulous Communications. An account number 96 is assigned to the company and any other pertinent information is included in the display as well.

FIG. 6 is a display of a screen shot illustrating a customer creation portion of the database where the remote site monitoring device data is stored and accessible by an individual in accordance with the present invention. In this screen shot, an administrator creates an access for each of the customers 94. In the preferred embodiment, an initial customer site ID 98 is assigned to the customer. The customer site ID 98 is unique for each location that a remote site monitoring device is located. For example, Company A, a customer of Cumulous Communications, might have various storage tanks around California. With a multitude of sites, a unique customer site ID 98 is assigned to each of the sites. This aids the customer and the database in sorting the data retrieved from all the sites.

The administrator is also able to use the activate button 100 to enable or disable the remote site. By enabling the sensors with the activate button 60, a command is transmitted to the remote site monitoring device to proceed to begin the monitoring device. If the sensor is disabled through the activate button 100, the remote site monitoring device is instructed to halt further data gathering activity with this particular sensor.

A section is also made available to enter the monthly cost per unit 102. The cost can be based on almost any setup. It can be for the remote site monitoring device or based on the sensor connected to the remote site monitoring device. This monetary figure is then used by the server to assess billing charges to the customer.

The customer's name 104 and pertinent postal information 106 is then stored in a number of entry slots. This is information is also used by the system to track the company as well as automatically create bills based on this and the cost per unit 102 figure.

A uniform resource locator (URL) of the customer's company's logo 108 is stored in the server as well. The locator is used, in the preferred embodiment, as a caption on each screen of the database that a user accesses. For example, Company A has a unique logo entitled CACO. In fact, it is well know by the term CACO rather than Company A. Each time a screen is accessed, the CACO logo is placed somewhere on the screen. This helps distinguish to the user that the data being accessed is that of CACO.

Finally, FIG. 6. also provides a section for the administrator to leave comments 110. There is no restriction on the amount or type of data to be stored in this system. The section gives the administrator a chance to add any additional information it deems necessary.

FIG. 7 is a display of an additional screen shot illustrating a customer's remote sensor listing with the computer database in accordance with one embodiment of the present invention. This screen shot is available to a user as well as the administrator. The user accesses this screen in order to obtain the most recent data from all of the sensors. The screen shot gives a multitude of different types of data.

In this particular screen shot, Company A, with account number 000001, has a complete listing of its remote sensors. Looking at the chart, there is total of seven sensors, which are measuring moisture, temperature and voltage. A first moisture sensor 112 is labeled 11A1, which is the unique identifier. From the description, it is a four-inch C-probe. All of this information is located in the first column 114.

Column two 116 details the location of the probe. The information, in this example, states that it is located at the Homeland location.

Column three 118 details the element or data being gathered by the probe. As stated previously, this probe is measuring moisture. The user or company has some need to measure the on-going moisture within some environment.

Column four 120 indicates the time and date of the last sensor reading. Therefore, the user of the data can determine the most recent data reading.

Column five 122 indicates the previous or most recent level. In this particular example, the Sep. 23, 2003 1:15 PM moisture reading was 60.12.

Column six 124 details whether an alarm level has been chosen by the user. The alarm level provides a point at which an alarm is triggered. If an alarm is triggered, it is transmitted in user-defined form to the user or company. For the first moisture probe 112, no alarm level has been enabled.

The battery voltage probe 126 has an alarm level 124. This probe 126 is measuring the battery voltage of the remote site monitoring device to ensure constant monitoring. The alarm level 124 for this particular probe is set for 11.25 volts. If the voltage drops below this level, an alarm is triggered. In the preferred embodiment, an electronic message is delivered to the user in the form of an e-mail. Alternate embodiments can inform the user, such as but not limited to, a sound, strobe or prerecorded message.

In the preferred embodiment, a visual display 130 is also supplied to indicate the level of voltage of the battery. The visual display 130 indicates, in this example, that the voltage is high.

Column seven 132 provides a link to additional details of the first moisture probe 112 such as the ID number, location element measure and many more. FIG. 7 further describes the information provided in this section in greater detail.

Column eight 134 permits the user of the data to view the history of the data collected. Initially, the setting is placed at the most recent date. The user is able to obtain all the readings of the probe back as far as the databases holds data. The administrator can elect to purge files at a pre-determined length of time, for instance 90 days. The user is also able to set a user-defined time period as well.

The historical view of the data provides the user with more accurate picture of the probe. A single point in time data reading is not always indicative of a problem as opposed to a series of readings taken over a period of time. Many times a single data point, though normal, will not trigger an alarm even thought the historical views of the data readings indicates a potential problem.

The final column in the preferred embodiment, column eight 136, permits the user to edit particular information about a specific probe. The type of information that can be edited in the preferred embodiment is the location, name and alarm setting. FIG. 9 details the editing process of the sensors in greater detail.

FIG. 8 is a display of an additional screen shot illustrating a customer's remote sensor information that is stored onto a computer database in accordance with one embodiment of the present invention. The information stored or entered into this screen is done for each sensor attached or linked to the remote site monitoring device. In this particular figure, the information being illustrated is that of battery voltage probe 126. There is some basic information stored such as the device ID 138, radio ID 140, unit ID 142, location 144 and address 146. Additional information stored is the global positioning coordinates 148, the element being measured 150, the capacity 152 of the element and the low-end adjustment 154.

There is also an alarm setting 156, which enables the user to define when they should be alerted as to a certain condition. In this current example, the alarm setting 156 is recorded as doing a comparison between the data value and the alarm setting 156. The logic of the alarm setting in this example is that if the data reading is equal to or below 11.25 volts, then an alarm is generated. In the preferred embodiment, the user is able to set-up an alarm signal based upon whether the data reading is above or below the alarm value. In alternate embodiments, the user is able to define a mathematical operation or formula to which the alarm check is processed.

The remote sensor information screen also provides the time, date and actual reading of the ten most recent readings for this unit. In this particular example, the sensor readings are for a specific time period from about 11:19 in the morning to about 1:30 pm. The voltage readings associated with these readings are 13.5 volts with one reading of 14 volts and one reading of 14.2 volts.

FIG. 9 is a display of an additional screen shot illustrating an editing process for a customer's remote sensor information that is stored onto a computer database in accordance with one embodiment of the present invention. In this figure, the user is able to define information displayed in FIG. 8. The fields that can be edited are the device ID 138, radio ID 140, customer radio ID 158, unit ID 142, location 144, address 160, global positioning coordinates 148, element measured 150 and the unit of measurement 162.

The capacity 152 of the element is entered as well, which in this example is fifteen volts. There is a low-end adjustment 164 entry that means that the value of the data reading cannot go below this value. There is also a minimum 166 and a maximum 168 reading. This means that the measurement data will not and cannot go above this reading.

The alarm setting 156 is selected, in this embodiment, to be a percentage of the capacity of the elements. In the present example, the setting is seventy-five percent. By selecting this percentage and the below setting 170, an alarm is triggered when the value is less than or equal to 11.25 volts.

There is also an alarm inactivity setting 172. This means that an alarm is also generated upon no reception or reported activity from the sensors. The setting, in the preferred embodiment, is based on days of inactivity with 0 to 365 being the range. The current example generates an alarm upon their being no reception of any data in one day.

There is also a section 174 for enabling or disabling the device. By enabling the device, the sensor can be polled or put on a timer such that data collection process is begun to be collected. If the sensor is disabled, the sensor is put on hold and no information is gathered. However, the information about the sensor is kept within the database. The advantage being that the information need not be reentered. All an administrator must do is enable the sensor or edit the data if the sensor has changed type of location.

In an alternate embodiment of the present invention, there can be a cause or situation for an intermittent station, where data from the sensors is temporarily transmitted. In some instances where cellular coverage is limited, use of the GPRS/GSM packet modem device is hampered. To overcome this problem, an interim station is used to transmit the data. In this embodiment, the telemetry transmitting device is used at the monitoring site to transmit to the interim site. At this location, another telemetry radio is used to push the data to a location where cellular coverage is more consistent or reliable.

In this alternate embodiment, the interim site is serving as a pipeline or additional communication to transmit the data. For example, there might be a monitoring location where cellular coverage is non-existent but is available approximately ten miles away. In this alternate embodiment, use of a GPRS/GSM packet modem device is not an option because of the lack of cellular coverage. Therefore, an interim station is used to transmit the data to the location ten miles away were cellular coverage is available.

At the monitoring station, a telemetry radio is used to transmit the data to the interim station. Located at the interim station is another telemetry radio that receives the information and then re-transmits the data to a base station or server 26 upon where the data is decompressed and/or made available for access.

In further embodiments, the interim station can be in an area that has access to cellular coverage. However, the monitoring location does not have access to cellular coverage. In this embodiment, the data is transmitted from the monitoring location to the interim station, where cellular coverage is available. At this point, the interim station transmit the data to the base station or server 26 via a GPRS/GSM packet modem device.

The interim station are generally note used at point to conduct a manipulation of the data. Generally, such manipulation takes places the base station or server 26 because of the availability of commercial power. At the monitoring and interim station, there is generally less availability of power and therefore the less desire to perform manipulations. However, it is contemplated by this invention to perform manipulation of the data at all the sites.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A server system for remote monitoring of environmental conditions, the server system comprising:
   a communication interface for cost-controlled communication over a wireless communications network with a microprocessor controlled control board at a remote location, the communication interface configured to receive packets which include sensor data;
   a processor configured to:
      process the packets which include sensor data received from the control board, wherein the packets have a predetermined maximum byte length based on control board report settings that control communication costs, and
      identify the sensor associated with the sensor data; and
   a storage device configured to store received sensor data according to the identification of the associated sensor.

2. The server system of claim 1, wherein the processor is further configured to determine whether an alarm level is triggered based on a combination of sensor data from two or more sensors.

3. The server system of claim 1, wherein the processor is further configured to generate instructions for the control board, the instructions concerning a determination of whether an alarm level is triggered for the sensor, and wherein the communication interface is further configured to transmit the instructions over the wireless communications network to the control board.

4. The server system of claim 1, further comprising a web interface that allows a user to:
   configure control board report settings, and
   access historical data of a selected sensor, wherein the historical data includes the sensor data stored in the storage device.

5. The server system of claim 4, wherein the web interface further allows the user to transmit calibration information regarding the sensor to the control board.

6. A method for operating a server system for remote monitoring of environmental conditions, the method comprising:
   receiving at least one packet which includes sensor data through a cost-controlled communication interface over a wireless communications network, the at least one packet sent from a control board at a remote location;

transmitting instructions over the wireless communications network to the control board for configuring control board report settings that control communication costs;
executing instructions stored in a memory of the server system, wherein execution of the instructions by a processor identifies the sensor associated with the sensor data in the received packet; and
storing the sensor data in memory according to the identification of the associated sensor.

7. The method of claim 6, wherein further execution of the instructions by the processor determines that an alarm level is triggered based on the sensor data of the sensor.

8. The method of claim 7, further comprising generating and transmitting instructions to the control board, the instructions concerning an action responsive to the environmental condition that triggered the alarm level.

9. The method of claim 6, further comprising receiving user input regarding sensor calibration, the input received through a web interface.

10. A non-transitory computer-readable storage medium, having embodied thereon a program being executable by a computer processor to perform a method for remote monitoring of environmental conditions by a plurality of sensors, the method comprising:
receiving at least one packet which includes sensor data through a cost-controlled communication interface over a wireless communications network, the at least one packet sent from a control board at a remote location;
transmitting instructions over the wireless communications network to the control board for configuring control board report settings that control communication costs;
identifying a sensor associated with the sensor data in the received packet; and
storing the sensor data in memory according to the identification of the associated sensor.

11. The non-transitory computer-readable storage medium of claim 10, further comprising instructions for receiving user input regarding sensor, the user input received through a web interface.

12. The non-transitory computer-readable storage medium of claim 10, further comprising instructions for transmitting an acknowledgement of successful communication to the control board upon receipt of the at least one data packet.

13. The non-transitory computer-readable storage medium of claim 10, further comprising instructions for transmitting instructions for configuring control board retransmission settings to the control board.

14. A remote monitoring system for monitoring environmental conditions by a sensor, the system comprising:
a communication interface for cost-controlled communication with a server system over a wireless communications network;
a sensor interface communicatively coupled to a sensor, the sensor interface configured to:
calibrate a sensor for data measurement by updating calibration information of the sensor, and
receive sensor data regarding data measurement from the sensor; and a microprocessor controlled control board configured to:
configure control board report settings that control communication costs, the configuration according to instructions received at the communications interface,
update calibration information of the sensor based on the instructions received at the communications interface, and
process the sensor data received at the sensor interface to form at least one data packet, wherein the at least one data packet has a predetermined maximum byte length based on the control board report settings that control communication costs, wherein the at least one data packet is transmitted from the communication interface to the system server.

15. The remote monitoring system of claim 14, wherein the sensor data from the sensor includes an identifier.

16. A method for operating a remote monitoring system for monitoring environmental conditions by a plurality of sensors, the method comprising:
calibrating a sensor for data measurement by updating calibration information of the sensor;
receiving sensor data from the sensor through a sensor interface;
receiving instructions through a communication interface to configure report settings that control communication costs;
executing instructions stored in memory, wherein execution of the instructions by a processor processes sensor data to form at least one data packet, wherein the at least one data packet has a predetermined maximum byte length based on the configured report settings that control communication costs; and
transmitting the at least one data packet through the communication interface.

17. A non-transitory computer-readable storage medium having embodied thereon a program, the program being executable by a computer processor to perform a method for operating a remote monitoring system for monitoring environmental conditions by a plurality of sensors, the method comprising:
calibrating a sensor for data measurement by updating calibration information of the sensor;
receiving sensor data from the sensor through a sensor interface;
receiving instructions through a communication interface to configure report settings that control communication costs;
processing sensor data to form at least one data packet, wherein the at least one data packet has a predetermined maximum byte length based on the configured report settings that control communication costs; and
transmitting the at least one data packet through the communication interface.

18. An apparatus for remotely monitoring environmental conditions by a plurality of sensors, the apparatus comprising:
a sensor configured to:
measure data concerning an environmental condition at a remote site,
process the measured sensor data, and
transmit the processed sensor data to a control board;
a memory device configured to store calibration information for the sensor;
a control board including a microprocessor, the control board configured to:
receive the processed sensor data from a sensor,
process the processed sensor data,
process the twice-processed sensor data to form at least one data packet, wherein the data packet has a predetermined maximum byte length based on control board report settings that control communication costs, and transmit the at least one packet to a server system.

19. The apparatus of claim 18, wherein the sensor is further configured to use the calibration information stored in the memory device to process the measured sensor data.

20. The apparatus of claim 18, wherein the control board is further configured to use the calibration information stored in the memory device to process the processed sensor data.

21. The apparatus of claim 18, wherein the sensor is further configured to use data compression to process the measured sensor data.

22. The apparatus of claim 18, wherein the control board is further configured to use data compression to process the processed sensor data.

* * * * *